United States Patent Office 3,139,577
Patented June 30, 1964

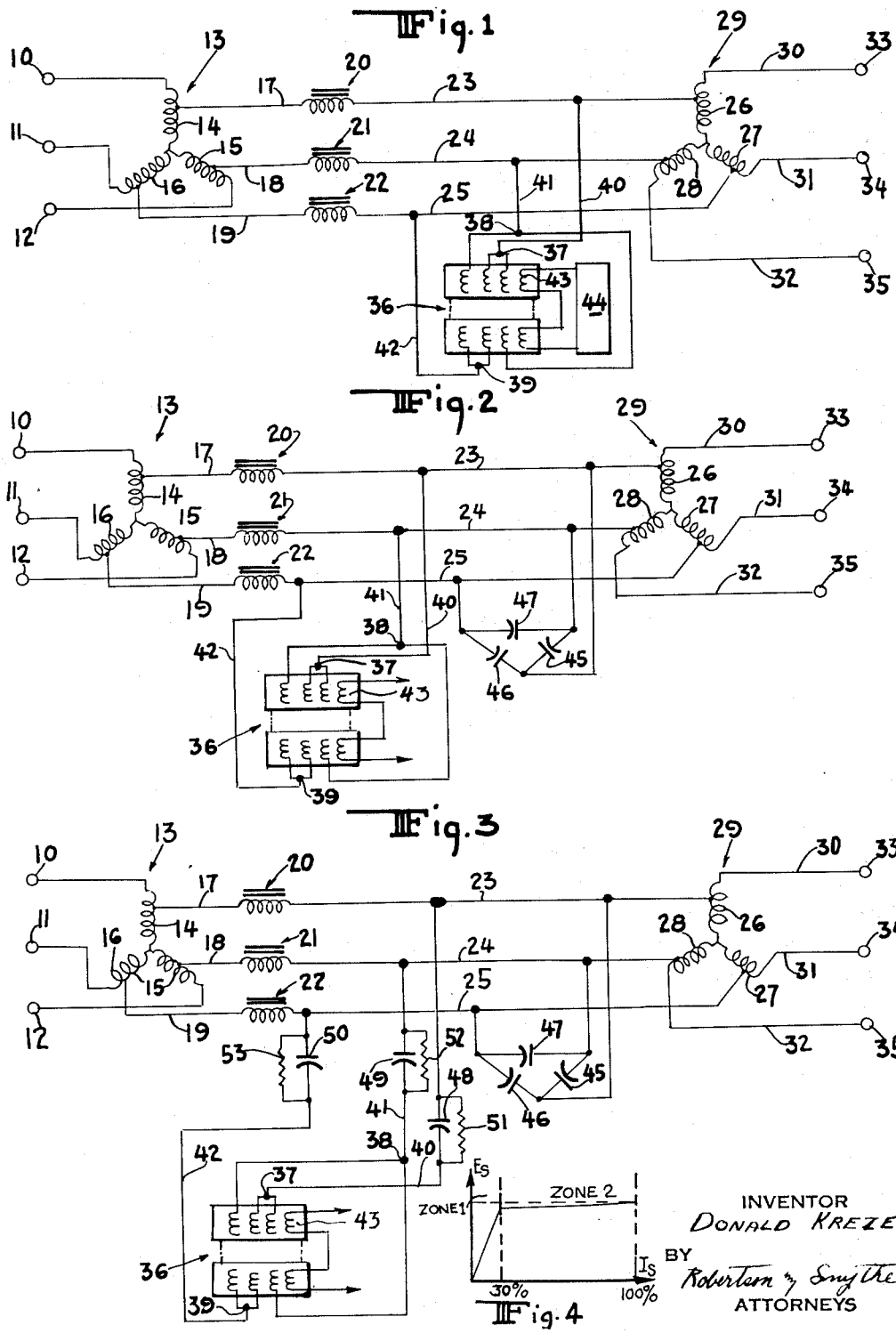

3,139,577
VOLTAGE AND POWER FACTOR REGULATOR USING POLY-UNIT, POLYPHASE SATURABLE REACTOR
Donald Krezek, Watertown, Wis., assignor to Basic Products Corporation, Milwaukee, Wis., a corporation of Wisconsin
Filed Aug. 22, 1960, Ser. No. 51,081
9 Claims. (Cl. 323—102)

This invention relates to a voltage regulator and particularly to one using a poly-unit, polyphase saturable reactor.

Many types of electrical equipment require that the power furnished to them be maintained at constant voltage despite fluctuations in the power supply. In addition to the requirement of constant voltage, equipment such as that used in data processing and other critical applications requires that a substantially sinusoidal wave form be provided at all time. In many applications, besides compensating for fluctuations in the voltage of the power supply, voltage regulators are required to operate with varying loads. Load fluctuations from full load to no load are encountered and these changes occur in substantially an instantaneous manner. The maintenance of constant voltage by a regulator may also be affected by fluctuations in the load power factor or different load power factors of the load connected to the regulator. In many industrial and laboratory operations, consistent results require that the regulator not only supplies constant voltage to the equipment but also that the regulator has rapid enough response time to correct for voltage fluctuations in the shortest amount of time so that the performance of the equipment is not affected.

One of the objects of the invention is to provide a voltage regulator for a polyphase system which is relatively insensitive to load power factor changes.

Another object of the invention is to provide a voltage regulator which is responsive to any change in load.

Another object of the invention is to provide a voltage regulator which will be responsive to input voltage variation.

Still another object of the invention is to provide a voltage regulator capable of providing a susbtantially sinusoidal output.

A still further object of the invention is to provide a voltage regulator which has unusually fast response characteristics.

In one aspect of the invention, a load is connected to a polyphase A.C. power source, preferably one having three $n$ phases, by means of serially connected reactor means, "$n$" being any whole number, usually 1. A poly-unit polyphase saturable reactor means, such as described in United States Patent No. 2,916,689, can be connected in shunt with the polyphase load. As described in said patent, the turns ratios of the windings and core areas are related so that as an A.C. voltage wave in the supply is applied, the reactor units will desaturate in a predetermined manner so as to produce the desired wave form, in this instance, a sinusoidal wave form. In operation, the current of the polyphase load and of the poly-unit polyphase saturable reactor flows through the reactor means and produces voltage drop across it. The change of the voltage drop upon a fluctuation of the source voltage or a fluctuation of the load serves to maintain a substantially constant voltage across the load. The arrangement also can be used with efficacy with other polyphase loads.

In another aspect of the invention, a $3n$ phase load may be serially connected to a source of A.C. power having $3n$ phases by means of serial reactor means. In addition to a shunt connected poly-unit polyphase saturable reactor, capacitive means are also connected in shunt across the load. The resultant current of the load, the poly-unit polyphase saturable reactor means, and the capacitive means causes a voltage drop across the series reactor means which serves to maintain a susbtantially constant and sinusoidal voltage across the load despite fluctuations of the A.C. power source and of the load.

In still another aspect of the invention, capacitive means are employed to connect the poly-unit polyphase saturable reactor means in shunt with the load. The series capacitive means serve to compensate for the saturated reactance of the poly-unit reactor so that its voltage-current characteristic is substantially flat after saturation has occurred. Such a capacitive means particularly is required when control windings or such are not employed in the poly-unit polyphase saturable reactor.

These and other objects, advantages and features will become apparent from the following description and drawings which are merely exemplary.

In the drawings:

FIG. 1 is one form of the invention employing the series reactor means and the shunt poly-unit polyphase saturable reactor means.

FIG. 2 is another form of the invention in which capacitive means together with the poly-unit polyphase saturable reactor means are connected in shunt with the load.

FIG. 3 is still another form of the invention in which the poly-unit polyphase saturable reactor is connected in shunt by means of series capacitive means.

FIG. 4 is a diagram showing voltage current relation of the poly-unit polyphase saturable reactor with series capacitors.

The circuit incorporating the voltage regulator of the invention may be connected to a polyphase A.C. system which preferably is $3n$ phase. The circuit shown in FIG. 1 is connected to a source of A.C. having three $n$ phases. The letter "$n$" may represent any whole number. For the circuit of FIG. 1, where $n$ is equal to 1, three phase power is delivered by means (not shown) to terminals 10, 11 and 12. Input transformer 13, which may be of the autotransformer type, having windings 14, 15 and 16, serves to connect the circuit to terminals 10, 11 and 12. In place of an autotransformer, an isolation transformer may be employed, or the transformer may be omitted. Windings 14, 15 and 16 of input transformer 13 are connected by lines 17, 18 and 19, respectively, to reactors 20, 21 and 22, respectively. Reactors 20, 21, 22 may be of the linear type in which the function of voltage across the reactor with respect to current through the reactor is substantially a straight line. Reactors 20, 21, 22 are connected by lines 23, 24 and 25, respectively, to windings 26, 27 and 28, respectively, of output transformer 29. Transformer 29 may be of the autotransformer type or instead an isolation transformer may be employed, or it may be omitted. Lines 30, 31 and 32 lead from windings 26, 27 and 28, respectively, to output terminals 33, 34 and 35 across which a $3n$ phase load may be connected. In FIG. 1, a poly-unit polyphase saturable reactor 36 of the type described in United States Patent No. 2,916,689 is schematically represented. Terminals 37, 38 and 39 of poly-unit polyphase saturable reactor 36 are connected by lines 40, 41 and 42, respectively, to lines 23, 24 and 25, respectively.

As stated above, reactors 20, 21 and 22 have a linear characteristic of voltage across the reactor with respect to current through the reactor. In contradistinction to this, poly-unit polyphase reactor 36 is not a linear device but actually operates over two different zones each of which is approximately linear. Referring to FIG. 4, the first zone of operation, zone 1, has a characteristic similar to that of the exciting current of a transformer. At a fraction of the current rating of the saturable reactor, such as 30% of the current rating, the slope of the characteristic changes drastically and enters into the second zone, zone 2, of operation. In the second zone, small changes in voltage produce a very large change in current. For example, the remainder of the rated current of the poly-unit polyphase saturable reactor, which may be of the order of 70% of the rated current, may be produced by a small increase in voltage, such as the value of 2% of the total voltage corresponding to the rated current of the poly-unit polyphase reactor. The phase relationship between reactor voltage and reactor current throughout the entire characteristic is similar to that of a linear reactor.

In operation, the extreme conditions which can occur are those of maximum input voltage from the power source at no load and the condition of low input voltage at full load. For both cases it is desired to maintain the voltage across the load substantially constant. The poly-unit polyphase saturable reactor is adapted for known load conditions and for the range of conditions of input voltage for which the regulator is to control. Under conditions of the highest input voltage at no load, the poly-unit polyphase reactor operates at its rated current value, drawing a large current through series reactors 20, 21 and 22. The drop across reactors 20, 21 and 22 serves to lower the voltage delivered by input transformer 13 so that a substantially constant voltage is applied to output transformer 29 and thus to output terminals 33, 34 and 35.

For the condition of low input voltage at maximum load or full load, poly-unit polyphase saturable reactor 36 is conditioned so that the point at which large changes in current occur for small changes in voltage, namely the beginning of zone 2, corresponds to the lowest input voltage for which the saturable reactor is to compensate. For voltage below that of the beginning of zone 2, the poly-unit polyphase reactor ceases to operate in the zone where large currents are drawn for small changes in voltage.

In some applications, control windings 43 may be incorporated in the poly-unit reactor as set forth in United States Patent No. 2,916,689. Control windings 43 are provided with control circuits 44 in order to fix the current flowing in the control windings.

In order to provide an input power factor approximating that of the load, capacitors 45, 46, 47 (FIG. 2) may be connected in shunt with both poly-unit polyphase saturable reactor 36 and windings 26, 27, 28 of output transformer 29. With this configuration, it may be seen that the current drawn by capacitors 45, 46, 47 leads the applied voltage by 90° as opposed to the current through poly-unit polyphase saturable reactor 36 which lags the applied voltage by 90°. Consequently, the currents of the capacitors and the poly-unit polyphase saturable reactor are in opposition. Under conditions of input voltage below that of the predetermined output voltage, poly-unit polyphase saturable reactor 36 draws a small lagging current while capacitors 45, 46, 47 draw a leading current. The result is a reversal of current flowing through reactors 20, 21, 22 so as to flow toward transformer 13, thereby effecting a voltage rise across the reactors from transformer 13 in the direction of the load. This voltage rise serves to maintain the predetermined voltage level across output terminals 33, 34, 35.

As shown in FIG. 3, poly-unit polyphase reactor 36 having terminals 37, 38, 39 may be provided with capacitors 48, 49, 50 which connect terminals 37, 38 and 39, respectively, to lines 23, 24 and 25, respectively. These series capacitors serve to compensate for the saturated reactance of the poly-unit polyphase saturable reactor so that the volt-ampere characteristic for the poly-unit polyphase reactor is substantially flat after its saturation. To preclude any tendency toward oscillation, capacitors 48, 49, 50 may be each shunted by resistors 51, 52, 53, respectively, which serve as damping devices. In addition to passing a leading current component through reactors 20, 21, 22 to correct for a low input voltage condition, capacitors 45, 46, 47 connected in shunt with output transformer 29 as shown in FIG. 3 also serve to correct for the possible low power factor characteristic of the load.

It should be apparent that variations may be made in the arrangement without departing from the spirit of the invention except as defined in the appended claims.

What is claimed is:

1. In a voltage regulator for a polyphase system, the combination including a polyphase A.C. power source, reactor means serially connecting said power source to a polyphase load, poly-unit saturable reactor means, capacitive means connecting said poly-unit polyphase saturable reactor means in shunt with said load, said capacitive means being adapted to compensate for the saturated reactance of said poly-unit polyphase saturable reactor means so as to provide a substantially flat volt-ampere characteristic to said poly-unit polyphase saturable reactor means after saturation, and additional capacitive means connected in shunt with said load, and adapted to correct for the load power factor, whereby the voltage drop produced by the flow of the resultant current of said load, said poly-unit polyphase saturable reactor means and said capacitive means through said reactor means, maintains a predetermined voltage across said load means substantially constant and sinusoidal despite fluctuations in the voltage of said A.C. power source above and below said predetermined voltage and fluctuations in said load.

2. In a voltage regulator for a polyphase system, the combination including a polyphase A.C. power source, reactor means serially connecting said power source to a polyphase load, poly-unit saturable reactor means having load windings and control windings, said load windings being connected in shunt with said load, means for controlling the current in said control windings being connected thereto, capacitive means connecting said poly-unit polyphase saturable reactor means in shunt with said load, said capacitive means being adapted to compensate for the saturated reactance of said poly-unit polyphase saturable reactor means so as to provide a substantially flat voltage-current characteristic to said saturable reactor means after saturation, and additional capacitive means connected in shunt with said load and adapted to correct for the load power factor, whereby the voltage drop produced by the flow of the resultant current of said load, said poly-unit polyphase saturable reactor means, and said capacitive means through said reactor means, maintains a predetermined voltage across said load means substantially constant and sinusoidal despite fluctuations in the voltage of said A.C. power source above and below said predetermined voltage and fluctuations in said load.

3. In a voltage regulator for a polyphase system, the combination including an A.C. polyphase power source, reactor means serially connecting said power source to a polyphase load, poly-unit polyphase saturable reactor means, having load windings and control windings, said load windings being connected in shunt with said load, means for controlling the current in said control windings being connected thereto, and capacitive means connecting said poly-unit polyphase saturable reactor means in shunt with said load, said capacitive means being adapted to compensate for the saturated reactance of said poly-unit polyphase saturable reactor means so as to provide a substantially flat voltage-current characteristic to said saturable reactor means after saturation, and resistive means connected in shunt with said capacative means to dampen any oscillation in said saturable reactor means, whereby the voltage drop produced by the flow of the resultant current of said load and said saturable reactor means through said reactor means, maintains the voltage across said load substantially constant and sinusoidal despite fluctuations in the voltage of said A.C. power source and fluctuations in said load.

4. In a voltage regulator for a $3n$ phase system, the combination including an A.C. power source having $3n$ phases, reactor means serially connecting said power source to a $3n$ phase load, poly-unit polyphase saturable reactor means for providing a sinusoidal current wave form connected in shunt with said load, and capacitive means connected in shunt with said load, whereby the voltage drop produced by the flow of the resultant current of said load, said poly-unit polyphase saturable reactor means and said capacitive means through said reactor means, maintains a predetermined voltage across said load substantially constant and sinusoidal despite fluctuations in the voltage of said A.C. power source above and below said predetermined voltage and fluctuations in said load.

5. In a voltage regulator for a $3n$ phase system, the combination including an A.C. power source having $3n$ phases, reactor means serially connecting said power source to a $3n$ phase load, poly-unit polyphase saturable reactor means having load windings and control windings for providing a sinusoidal current wave form, said load windings being connected in shunt with said load, means for controlling the current in said control windings being connected thereto, and capacitive means connecting said poly-unit polyphase saturable reactor means in shunt with said load, said capacitive means being adapted to compensate for the saturated reactance of said poly-unit polyphase saturable reactor means so as to provide a substantially flat voltage-current characteristic to said poly-unit polyphase saturable reactor means after saturation, whereby the voltage drop produced by the flow of the resultant current of said load and said poly-unit polyphase saturable reactor means through said reactor means, maintains the voltage across said load substantially constant and sinusoidal despite fluctuations in the voltage of said A.C. power source and fluctuations in said load.

6. In a voltage regulator for a $3n$ phase system, the combination including an A.C. power source having $3n$ phases, reactor means serially connecting said power source to a $3n$ phase load, poly-unit saturable reactor means, capacitive means connecting said poly-unit polyphase saturable reactor means in shunt with said load, said capacitive mean being adapted to compensate for the saturated reactance of said poly-unit polyphase saturable reactor means so as to provide a substantially flat volt-ampere characteristic to said poly-unit polyphase saturable reactor means after saturation, and additional capacitive means connected in shunt with said load and adapted to correct for the load power factor, whereby the voltage drop produced by the flow of the resultant current of said load, said poly-unit polyphase saturable reactor means and said capacitive means through said reactor means, maintains a predetermined voltage across said load substantially constant and sinusoidal despite fluctuations in the voltage of said A.C. power source above and below said predetermined voltage and fluctuations in said load.

7. In a voltage regulator for a $3n$ phase system, the combination including an A.C. power source having $3n$ phases, reactor means serially connecting said power source to a $3n$ phase load, poly-unit saturable reactor means having load windings and control windings, said load windings being connected in shunt with said load, means for controlling the current in said control windings being connected thereto, capacitive means connecting said poly-unit polyphase saturable reactor means in shunt with said load, said capacitive means being adapted to compensate for the saturated reactance of said poly-unit polyphase saturable reactor means so as to provide a substantially flat voltage-current characteristic to said poly-unit polyphase saturable reactor means after saturation, and additional capacitive means connected in shunt with said load and adapted to correct for the load power factor, whereby the voltage drop produced by the flow of the resultant current of said load, said poly-unit polyphase saturable reactor means, and said capacitive means through said reactor means, maintains a predetermined voltage across said load substantially constant and sinusoidal despite fluctuations in the voltage of said A.C. power source above and below said predetermined voltage and fluctuations in said load.

8. In a voltage regulator for a $3n$ phase system, the combination including an A.C. power source having $3n$ phases, reactor means serially connecting said power source to a $3n$ phase load, poly-unit polyphase saturable reactor means, capacitive means connecting said poly-unit polyphase saturable reactor means in shunt with said load, said capacitive means being adapted to compensate for the saturated reactance of said poly-unit polyphase saturable reactor means so as to provide a substantially flat voltage-current characteristic to said poly-unit polyphase saturable reactor means after saturation and resistive means connected in shunt with said capacitive means to dampen any oscillation in said poly-unit polyphase saturable reactor means, whereby the voltage drop produced by the flow of the resultant current of said load, said poly-unit polyphase saturable reactor means and said capacitive means through said reactor means, maintains a predetermined voltage across said load substantially constant and sinusoidal despite fluctuations in the voltage of said A.C. power source above and below said predetermined voltage and fluctuations in said load.

9. In a voltage regulator for a $3n$ phase system, the combination including an A.C. power source having $3n$ phases, reactor means serially connecting said power source to a $3n$ phase load, poly-unit polyphase saturable reactor means, having load windings and control windings, said load windings being connected in shunt with said load, means for controlling the current in said control windings being connected thereto, capacitive means connecting said poly-unit polyphase saturable reactor means in shunt with said load, said capacitive means being adapted to compensate for the saturated reactance of said poly-unit polyphase saturable reactor so as to provide a substantially flat voltage-current characteristic to said poly-unit polyphase saturable reactor means after saturation, and resistive means connected in shunt with said capacitive means to dampen any oscillation in said poly-unit polyphase saturable reactor means, whereby the voltage drop produced by the flow of the resultant current of said load and said poly-unit polyphase saturable reactor means through said reactor means, maintains the voltage across said load substantially constant and sinusoidal despite fluctuations in the voltage of said A.C. power source and fluctuations in said load.

References Cited in the file of this patent

UNITED STATES PATENTS

| 2,380,522 | Haug | July 31, 1945 |
| 2,421,786 | Haug | June 10, 1947 |
| 2,598,437 | Bedford | May 27, 1952 |
| 2,916,689 | Selin | Dec. 8, 1959 |